United States Patent [19]

Maldonado et al.

[11] Patent Number: 5,400,078
[45] Date of Patent: Mar. 21, 1995

[54] CIRCUIT FOR IDENTIFYING TELEVISION STANDARDS

[75] Inventors: Pierre-Jean Maldonado, Seyssins; Sylvain Quemener, Chirens, both of France

[73] Assignee: SGS-Thomson Microelectronics S.A., Gentilly, France

[21] Appl. No.: 122,373

[22] Filed: Sep. 16, 1993

[30] Foreign Application Priority Data

Sep. 18, 1992 [FR] France ................ 92 11554

[51] Int. Cl.$^6$ .......................... H04N 5/46; H04N 9/64
[52] U.S. Cl. ...................................... 348/558; 348/555
[58] Field of Search .............. 348/555, 557, 558, 638, 348/604, 455; H04N 5/46, 9/64

[56] References Cited

U.S. PATENT DOCUMENTS

| | | |
|---|---|---|
| 4,240,102 | 12/1980 | Goenewes ............... 358/11 |
| 4,438,451 | 3/1984 | Hinn et al. ............... 358/11 |

FOREIGN PATENT DOCUMENTS

| | | | |
|---|---|---|---|
| 0146777 | 7/1985 | European Pat. Off. | ....... H04N 9/64 |
| 4417255 | 8/1991 | European Pat. Off. | ....... H04N 9/64 |
| 562415 | 9/1993 | European Pat. Off. | ....... H04N 9/64 |

OTHER PUBLICATIONS

IEEE Transactionson Consumer Electronics, vol. 31, No. 3, Aug. 1985, New York, US. pp. 147–155, Peru et al., "A Fully Automatic Multistandard TV Chrominance Decoder".

*Primary Examiner*—James J. Goody
*Assistant Examiner*—Glenton B. Burgess
*Attorney, Agent, or Firm*—Wolf, Greenfield & Sacks

[57] ABSTRACT

A Standard identification circuit has a capacitor that is gradually charged in a constant progression direction if the Standard is appropriate and in a reverse progression direction when the voltage across the capacitor reaches a low threshold. The circuit operates symmetrically (the charging and discharging currents of the capacitor have equal value) when the voltage across the capacitor is lower than an intermediate threshold, and operates asymmetrically (the discharging current is higher than the charging current) when the voltage is higher than the intermediate threshold.

15 Claims, 3 Drawing Sheets

CIRCUIT FOR IDENTIFYING TELEVISION STANDARDS

BACKGROUND OF THE INVENTION

1. Field of the Invention

The present invention relates to the field of color television and, more particularly, to a circuit for identifying Standards in a color television set capable of receiving several Standards.

2. Discussion of the Related Art

In order to decode a video signal and to restore a color picture, a color television set must detect the transmitted TV color Standard. Present color TV sets include a system for automatically identifying the Standard that is used.

PAL and SECAM are two Standards amongst other Standards that are used. For both Standards, each line of the composite video signal includes a synchronization top, an identification burst comprising some periods of the chrominance sub-carrier signal, then the signal itself corresponding to the picture, including the superposition of luminance information and chrominance information, the chrominance information being carried by the luminance signal.

The characteristic features of the chrominance sub-carrier in the various PAL, SECAM and other Standards are defined in published documents relating to those Standards, and will not be described in detail here. However, the main characteristics of the PAL and SECAM Standards will be briefly described because these indications are useful for a better understanding of the invention.

In the PAL Standard, the frequency of the chrominance sub-carrier is the same for all the lines. For the identification bursts, the phase of the modulation vector oscillates between $+135°$ and $-135°$ from one line to the next one. The frequency of the chrominance sub-carrier is standardized at 4.43 MHz.

In the SECAM Standard, two frequencies of the chrominance sub-carrier that alternate from one line to the next one between 4.25 MHz and 4.40 MHz, are used. Those two chrominance sub-carriers are frequency modulated.

Present multi-Standard televisions must internally include distinct systems operable for decoding the luminance and chrominance signals for each Standard used. The televisions must therefore previously identify the received Standard.

FIG. 1 schematically shows a conventional circuit for identifying the PAL Standard. This circuit includes a phase comparator 10 providing a signal P active if the phase difference between two input signals of the comparator is positive, or a signal N active if the phase difference is negative. Comparator 10 receives at a first input the above-mentioned bursts at the 4.43 -MHz frequency of the sub-carrier. The second inputs of comparator 10 receives a signal Fp at the sub-carrier frequency through a circuit 12 providing to signal Fp a $+90°$ or $-90°$ phase. The selection of the $+90°$ or $-90°$ phase is determined by the state of a flip-flop 14 (FF) clocked by a signal Fh having a frequency equal to the line frequency. The role of flip-flop 14 will be understood later on.

Signal P indicating the positive sign ($+90°$) controls a current source Ic connected to a supply voltage Vcc. Signal N indicating the negative sign ($-90°$) controls a current source Id serially connected between the source Ic and ground. Sources Ic and Id provide equal currents. The junction between sources Ic and Id is connected to a terminal A of a capacitor C having its second terminal connected to ground. In the absence of control of one of sources Ic and Id, the voltage across capacitor C is pulled up to a value $Vref=Vcc/2$ through a connection of resistors R1 and R2. VA is the voltage at terminal A and across capacitor C.

Signals P and N are significant only during the bursts that occur, as above indicated, at the beginning of each line during short time periods (approximately 4 ms for a 64-ms line period). To take this situation into account, current sources Ic and Id are enabled by a window signal BG that is active only during each burst period.

With this configuration, capacitor C is charged or discharged by a constant value during each burst depending on whether signal P or signal N, respectively, is enabled. Resistors R1 and R2 have a high value in order not to substantially impair charging of capacitor C from one burst to the next one.

The elements of FIG. 1 not yet described will be explained later on.

FIG. 2 schematically shows the elements, that differ from FIG. 1, of a conventional circuit operable for identifying the SECAM Standard. Flip-flop 14 is in the present example connected to the phase comparator 10 in a configuration where the state of the flip-flop determines whether the indication of the sign provided by the phase comparator 10 is inverted or not with respect to the result of the comparison. A first input of comparator 10 receives the bursts. The second input of comparator 10 is connected to ground through a capacitor C1 and an inductance L1 that are parallel connected, and to the first input through a capacitor Cs. The resonance frequency of circuit L1C1 is set at an intermediate frequency between the red sub-carrier frequency and the blue sub-carrier frequency. The other elements (not shown) of the circuit operable for identifying the SECAM Standard are identical to the elements of FIG. 1.

In the circuits of FIGS. 1 and 2, without taking into account the presence of flip-flop 14, the indication of the sign, provided by comparator 10, is inverted every two lines when the Standard received is the appropriate one. The purpose of flip-flop 14, whose state switches at each line, is to ensure that comparator 10 provides a constant indication on the polarity sign from one line to the next one when the Standard received is the appropriate one.

FIG. 3A shows the voltage VA across capacitor C over time when the Standard received by one of the circuits of FIGS. 1 and 2 is the appropriate one. Depending on the initial state of flip-flop 14, voltage VA varies in a constant direction by steps occurring successively at the line frequency, either by increasing from value Vref (shown in solid lines), or by decreasing from value Vref (shown in dashed lines). The transition phases from one step to the next one correspond to the charging or discharging phases of capacitor C during the occurrence of bursts. To identify the received Standard, it is only necessary to detect that voltage VA reaches a high threshold value $Vref+Vt$ or a low threshold value $Vref-Vt$. If the received Standard is inappropriate, voltage VA randomly oscillates about value Vref and, theoretically, does not reach the threshold voltages $Vref+Vt$ and $Vref-Vt$.

In a specific implementation of the identification circuit, it is tried to obtain charging of capacitor C when the received Standard is appropriate. In this case, when the initial state of flip-flop 14 is erroneous, that is, when capacitor C starts discharging when the received Standard is appropriate, the state of flip-flop 14 must be inverted in order to invert the polarity of the sign indication (P, N) provided by the phase comparator 10. As shown in FIG. 1, the inversion is made with a comparator 16 that provides a reset signal R to flip-flop 14 when the voltage across capacitor C reaches the low threshold value Vref−Vt.

FIG. 3B shows the voltage VA over time, in the above example, when the received Standard is appropriate. The initial state of flip-flop 14 is erroneous. Voltage VA starts gradually decreasing. At a time t1, voltage VA drops below the low threshold voltage Vref−Vt and the reset signal R of flip-flop 14 is enabled. As long as signal R is enabled, flip-flop 14 remains in its last state, which is equivalent to an inversion of the state of the flip-flop during the next transition phase starting at a time t2. From time t2, voltage VA increases and passes over the threshold voltage Vref−Vt; signal R is disabled. Then, voltage VA starts gradually increasing to finally reach the high threshold voltage Vref+Vt, which is detected by a comparator 18. Then, comparator 18 indicates that the received Standard is identified.

The invention, as will be seen subsequently, only applies to such an identification circuit having a single detection threshold (Vref+Vt).

The actual operation of the circuits of FIGS. 1 and 2 is not ideal. In fact, each of these circuits can detect an inappropriate Standard as being appropriate because of the presence of noise in the received signals and parasitic phase variation phenomena. Such random phenomena cause, over a long period of time, as many positive sign indications as negative sign indications at the output of comparator 10. However, over a short period of time, there may appear a sufficient number of positive indications with respect to negative indications so that the voltage across capacitor C reaches the detection threshold Vref+Vt, which causes an erroneous detection.

One solution to avoid this problem is to increase the period preceding the detection phase by slowing down the progression of voltage VA. This is accomplished by decreasing the value of currents Ic and Id or the value of the pull-back resistors R1 and R2. However, this solution decreases the sensitivity of the identification circuit, and the Standard of very noisy signals can no longer be identified. The presence of noise causes, even if the received Standard is the appropriate one, the occurrence, from time to time, of signs having an erroneous polarity. These parasitic indications may prevent voltage VA from reaching the detection threshold, more particularly if the progression of voltage VA is slowed down.

An alternative solution is to connect in parallel several identification circuits operating according to different detection criteria. Such a solution is complex.

A further solution is, prior to selecting a Standard, to check the indications of the various Standard identification circuits and to resume an identification phase (that is, pulling-back the voltage across capacitor C to value Vref), until a single identification circuit indicates a detection. Such a method is time-consuming: an identification phase is carried out over approximately two frames.

SUMMARY OF THE INVENTION

An object of the invention is to provide a Standard identification circuit having a single detection threshold, that is particularly reliable while remaining simple and having a low sensitivity to noise.

This object is achieved according to the invention with a circuit symmetrically operating (the capacitor C having equal charging and discharging currents) when voltage VA is within a range including the reset threshold (Vref−Vt), and asymmetrically operating (the discharging current being higher than the charging current) when voltage VA is within a range including the detection threshold (Vref+Vt).

The invention more particularly relates to a circuit for identifying a television Standard including a phase comparator connected according to a predetermined configuration so as to provide a sign indication that tends to constantly have the same polarity when the Standard is the one to be identified; constant current sources respectively charging and discharging a capacitor with equal currents, the current sources being respectively enabled by a respective polarity of said sign indication during periodic time intervals having a constant duration; a flip-flop associated with the phase comparator to switch the polarity of the sign indication if the voltage across the capacitor reaches a first extreme threshold voltage; and a Standard detector, that is enabled when the voltage across the capacitor exceeds a second extreme threshold voltage. The invention provides means that are enabled when the voltage across the capacitor enters a range including the second extreme threshold voltage, in order to increase the current of the charging or discharging source by a predetermined factor, which tends to separate the voltage across the capacitor from the second extreme threshold voltage. The latter range starts at a threshold voltage intermediate between the first and second extreme threshold voltages.

According to an embodiment of the invention, the above-mentioned means include a second comparator receiving the voltage across the capacitor and the intermediate threshold voltage, and an additional constant current source, that is connected, by the action of the second comparator, in parallel with the charging or discharging current source, which tends to separate the voltage across the capacitor from the extreme threshold voltage.

According to an embodiment of the invention, the second comparator includes a two-transistor differential stage, the additional current source forming the emitter load of the transistors, a floating terminal of the capacitor being connected to the collector and to the base of a first transistor of the two transistors.

According to an embodiment of the invention, the first transistor is Darlington-connected.

According to an embodiment of the invention, the additional current source is formed by a transistor connected in parallel to the base and emitter of a current mirror output transistor, forming the current source to which the additional current source has to be connected in parallel.

The foregoing and other objects, features, aspects and advantages of the invention will become apparent from the following detailed description of the present invention when taken in conjunction with the accompanying drawings.

DETAILED DESCRIPTION

Figure 1:
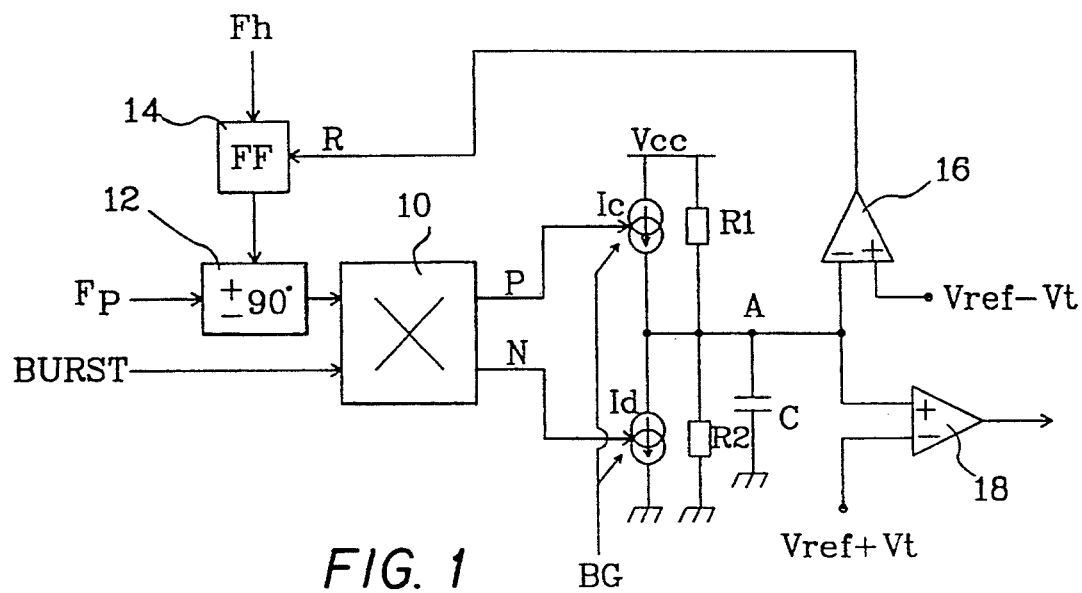
FIGS. 1 and 2, above described, schematically represent two conventional Standard identification circuits.
Figure 2:
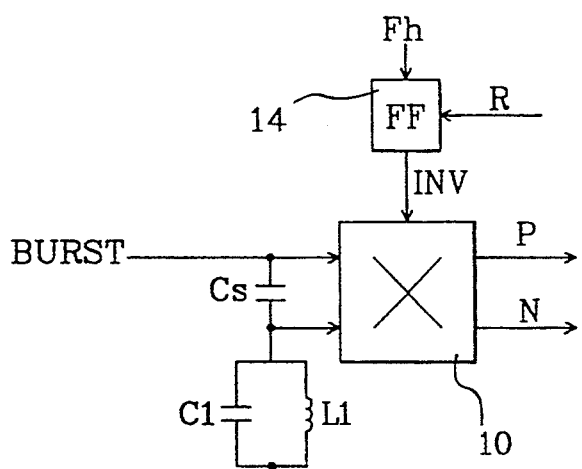
Figure 4:
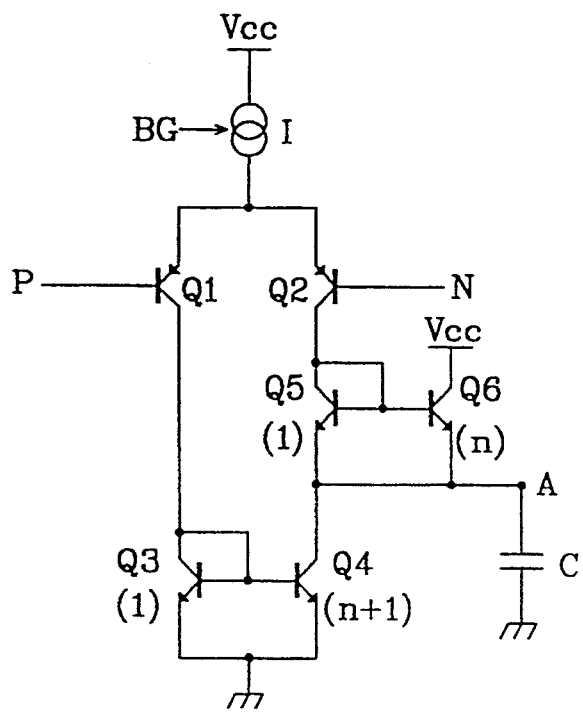
FIG. 4 represents a conventional embodiment of charging and discharging current sources for the capacitor of the circuits of FIGS. 1 and 2.

FIG. 4 represents a conventional implementation of the charging and discharging current sources Ic, Id of the identification circuits of FIGS. 1 and 2. The sign indicating outputs P and N of comparator 10 of the previous drawings are applied to the inputs of a differential stage including two PNP transistors Q1 and Q2. The emitters of transistors Q1 and Q2 are charged by a constant current source I connected to voltage Vcc. Source I is additionally enabled by the burst window signal BG. Transistor Q1 receives at its base signal P and its collector is connected to the input of a current mirror formed by NPN transistors Q3 and Q4. Transistor Q3 is diode-connected, that is, its collector and its base are interconnected. The collector and the base of transistor Q3 form the mirror input and are connected to the base of transistor Q4. The collector of transistor Q4 forms the mirror output. The emitters of transistors Q3 and Q4 are grounded.

Transistor Q2 receives signal N at its base and its collector is connected to the input of a mirror that is formed by NPN transistors Q5 and Q6 connected in the same manner as transistors Q3 and Q4, transistor Q5 being diode-connected. The collector of transistor Q6 is connected to voltage Vcc and the emitters of transistors Q5 and Q6 are connected to the collector of transistor Q4 and to terminal A of capacitor C. Additionally, the mirror Q3, Q4 is a multiplier by a factor n+1, and mirror Q5, Q6 is a multiplier by a factor n. This is obtained by adequately selecting the areas of transistors Q3-Q6.

When signal N is active, transistor Q2 is off and transistor Q1 is conductive. The current of source I integrally passes through transistor Q1 up to the input of mirror Q3, Q4. There is in the collector of transistor Q4 a current having a value (n+1)I discharging capacitor C. When signal P is active, transistor Q1 is off and transistor Q2 is conductive. Current I integrally passes through transistor Q2 up to the input of mirror transistor Q5, Q6. The collector current of transistor Q6 is established at nI and the sum (n+1)I of the emitter currents of transistors Q5 and Q6 charges capacitor C.

Figure 3A:
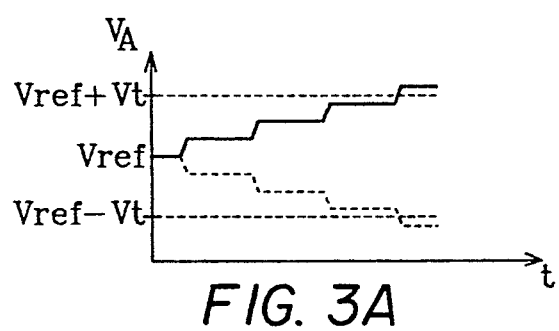
FIGS. 3A and 3B, above described, schematically show the voltage over time across a capacitor of the circuits of FIGS. 1 and 2.
Figure 3B:
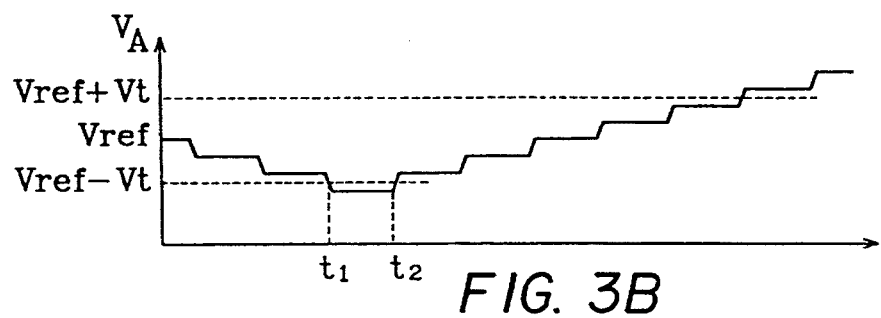
Figure 5:
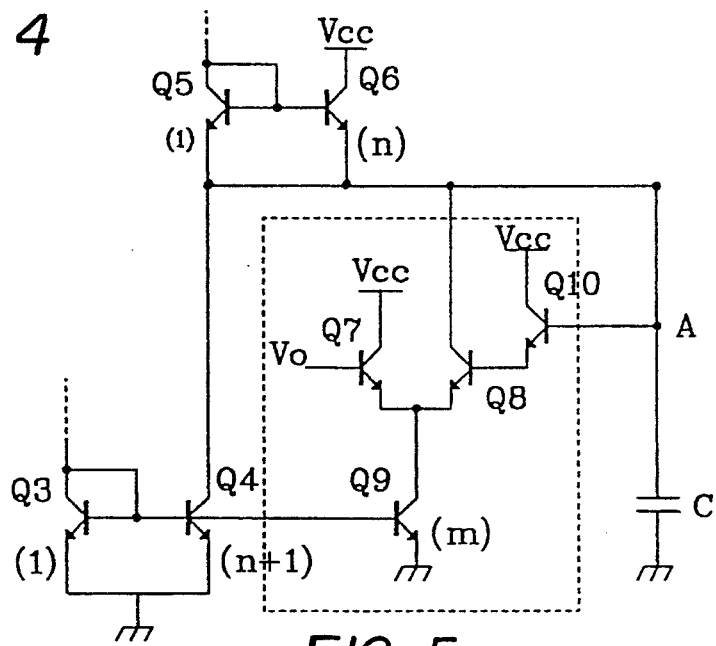
FIG. 5 represents an embodiment of a device according to the invention incorporated in the circuit of FIG. 4.

FIG. 5 schematically represents, in a rectangle drawn in dotted line, an embodiment of a device according to the invention for, in the circuit of FIG. 4, increasing the discharging current of capacitor C by a constant factor when voltage VA across capacitor C becomes higher than a value Vo substantially equal to Vref. Such a device includes a differential stage having two NPN transistors Q7 and Q8. The emitters of transistors Q7 and Q8 are connected to the collector of an NPN transistor Q9 that is connected in parallel to the base and the emitter of transistor Q4. The area ratio between transistors Q9 and Q3 is equal to m. With this configuration, transistor Q9 serves as a current source providing a current equal to the collector current of transistor Q3 multiplied by m. The base of transistor Q7 receives voltage Vo, and the collector of transistor Q7 is connected to voltage Vcc. The collector of transistor Q8 is connected to terminal A of capacitor C. Transistor Q8 is connected as a Darlington-circuit with a transistor Q10 having its base connected to terminal A and its collector connected to voltage Vcc. With this configuration, when the voltage at terminal A is lower than Vo+Vbe (Vbe being the base-emitter voltage of transistor Q10), transistor Q7 is conductive and transistor Q8 is off. Then, transistor Q7 derives the whole current of the collector of transistor Q9. Under those conditions, the operation of the circuit is the same as the operation of the circuit of FIG. 3.

When voltage VA exceeds Vo+Vbe, transistor Q8 becomes conductive and transistor Q7 off. The collector current of transistor Q9 is then integrally derived from terminal A. This current is zero during the non-charging phase of capacitor C, that is, when the collector current of transistor Q3 is zero. During the discharging phase of capacitor C, the latter is discharged by a current equal to n+1 +m, whereas, during the charging phase, the capacitor is charged by a current equal to (n+1)I.

Thus, as long as the voltage across capacitor C remains lower than Vo+Vbe, capacitor C is charged or discharged, as a function of the sign indications provided by the phase comparator 10, with a current (n+1)I. As soon as the voltage across capacitor C exceeds Vo+Vbe, capacitor C is still charged by a current (n+1)I but is discharged by a current (n+1 +m)I. Hence, when the voltage across capacitor C is within the range comprised between Vo+Vbe and Vref+Vt, more weight is given to a negative indication than to a positive indication.

As indicated above, when an inappropriate Standard signal is received, the indications on the sign that are provided by comparator 10 are practically arbitrary, and the number of positive indications is equal to the number of negative indications over a long time period. However, over a short time period, the number of positive indications may be sufficiently higher than the number of negative indications so that voltage VA reaches the detection threshold Vref+Vt. By giving more weight to the negative indications, the time when voltage VA is liable to reach the detection threshold is delayed; thus, there are more chances to obtain an equal number of negative and positive indications, that is, more chances not to make the voltage across capacitor C vary.

Additionally, when a signal corresponding to an appropriate Standard is received, theoretically, most of the sign indications will finally be positive indications, which causes the highest weight assigned to the negative indications to have little effect on the charging speed of capacitor C. Additionally, since the charging current must not be chosen at a low value in order to extend the detection duration (which is one of the conventional methods used to limit erroneous detections), the noise sensitivity of the circuit according to the invention is little affected.

A fully asymmetrical system, that is, in which the discharging current is higher than the charging current over the whole variation range of voltage VA, is not possible.

Figure 6:
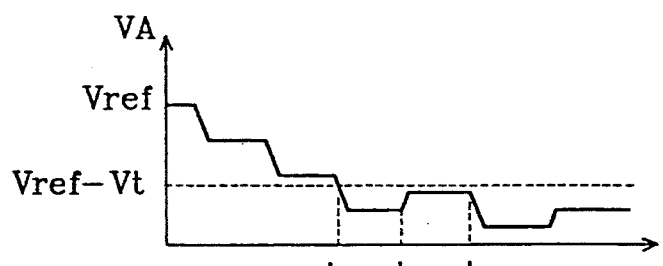
FIG. 6 represents the voltage over time across the capacitor in an example where an asymmetrical operation occurs over the whole range included between a detection threshold and a reset threshold.
Figure 7:
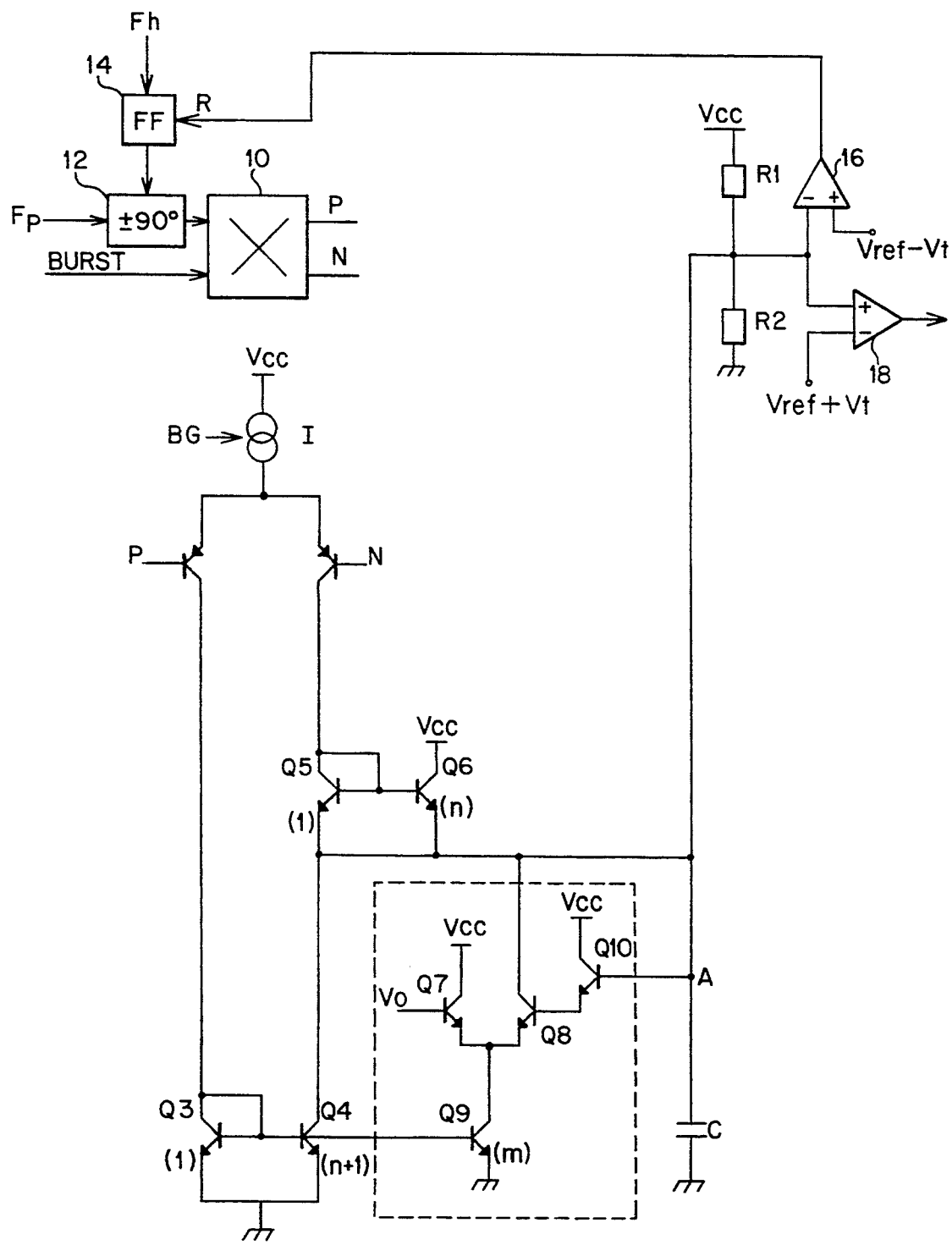
FIG. 7 illustrates the invention incorporated into the circuit of FIG. 1.

FIG. 6 exemplifies what would happen in such a case, and shows the voltage VA over time when the received Standard is the appropriate one and when the initial state of flip-flop 14 is initially erroneous. Voltage VA starts gradually decreasing and reaches threshold Vref−Vt, for example at a time t3 when voltage VA has a value close to the value of the preceding step. The reset signal R is enabled and flip-flop 14 remains in the state it was at time t3 at the beginning t4 of the next step transition phase. At time t4, voltage VA increases, but does not pass over threshold Vref−Vt, which is quite possible because the charging current is lower than the discharging current. Hence, signal R remains enabled and flip-flop 14 remains in the same state at the beginning t5 of the next transition phase. At time t5, voltage VA decreases, and so forth. Voltage VA will no longer be capable of crossing threshold Vref−Vt and it will not be possible to detect that the received Standard is the appropriate one.

The following exemplary values can be cited:
Vo=Vref=Vcc/2;
I=50 microamperes;
C=10 nanofarads;
n=4.

The value of the collector current of transistor Q9 can be selected between 10 to 30% of that of transistor Q4, for example 20% with m=1.

As is apparent to those skilled in the art, various variants and modifications can be made to the above disclosed embodiments of the invention. For example, the base of transistor Q8 can be directly connected to the terminal A of capacitor C. Voltage Vo can have any value close to Vref. The charging current will be increased with respect to the discharging current if the Standard detection threshold is the low threshold Vref−Vt.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. A circuit for identifying a television Standard of a video signal, comprising:
a phase comparator connected according to a predetermined configuration so as to provide a sign indication indicative of the phase relationship between the video signal and a comparison signal, the sign indication having the same polarity when the video signal is of the Standard to be identified;
constant current sources having an equal value for charging and discharging a capacitor, the sources being respectively enabled by respective polarities of said sign indication during periodic time intervals having a constant duration;
a flip-flop associated with the phase comparator to switch the polarity of the sign indication if the voltage across the capacitor reaches a first extreme threshold voltage;
a Standard detector that is enabled when the voltage across the capacitor exceeds a second extreme threshold voltage; and
means that are enabled when the voltage across the capacitor enters a range including the second extreme threshold voltage, in order to increase, by a predetermined factor, the current of the charging or discharging source, to separate the voltage across the capacitor from the second extreme threshold voltage, said range starting at an intermediate threshold voltage between the first and second extreme threshold voltages.

2. The circuit of claim 1, wherein said means include a second comparator receiving the voltage across the capacitor and said intermediate threshold voltage, and an additional constant current source connected, in parallel with the charging or discharging current source, to separate the voltage across the capacitor from the second extreme threshold voltage, the additional constant current source being activated to charge or discharge the capacitor when the second comparator detects that the voltage across the capacitor is within the range.

3. The Standard identification circuit of claim 2, wherein the second comparator includes a differential stage having two transistors, said additional current source forming an emitter charge of the transistors, a floating terminal of the capacitor being connected to a collector and to a base of a first transistor of the two transistors.

4. The circuit of claim 3, wherein said first transistor is connected as a Darlington circuit.

5. The circuit of claim 3, wherein the additional current source is formed by a transistor connected in parallel to a base and an emitter of a current mirror output transistor of the constant current source.

6. A circuit for identifying a television Standard of a video signal, comprising:
means for phase comparing, connected according to a predetermined configuration, for providing a sign indication indicative of the phase relationship between the video signal and a comparison signal, the sign indication having the same polarity when the video signal is of the Standard to be identified;
current source means for providing constant currents having equal values for charging and discharging a capacitor and being respectively enabled by respective polarities of said sign indication during periodic time intervals having a constant duration;
means, associated with the means for phase comparing, for switching the polarity of the sign indication if the voltage across the capacitor reaches a first extreme threshold voltage;
means for detecting a Standard that is enabled when the voltage across the capacitor exceeds a second extreme threshold voltage;
means that are enabled when the voltage across the capacitor enters a range including the second extreme threshold voltage for increasing the current of charging or discharging currents provided by the current source means by a predetermined factor to separate the voltage across the capacitor from the second extreme threshold voltage, said range starting at an intermediate threshold voltage between the first and second extreme threshold voltages.

7. The circuit of claim 6, wherein the means for increasing the charging or discharging currents provided by the current source means includes a second comparator receiving the voltage across the capacitor and said intermediate threshold voltage, and an additional constant current source connected, by the action of the second comparator, in parallel with the charging or discharging current source, to separate the voltage across the capacitor from the second extreme threshold voltage.

8. The circuit of claim 7, where the second comparator includes a differential stage having two transistors, said additional current source forming an emitter charge of the transistors, a floating terminal of the capacitor being connected to a collector and to a base of a first transistor of the two transistors.

9. The circuit of claim 8, wherein said first transistor is connected as a Darlington circuit.

10. The circuit of claim 8, wherein the additional current source is formed by a transistor connected in parallel to a base and an emitter of the current mirror output transistor, forming the current source to which the additional current source is connected in parallel.

11. A method for identifying a television Standard of a video signal, the method comprising the steps of:
 (a) comparing the video signal with a comparison signal to determine a phase relationship between the video signal and the comparison signal;
 (b) providing a first charging or discharging current to a capacitor in response to the phase relationship detected in step (a) to charge or discharge the capacitor at a first rate;
 (c) comparing a voltage across the capacitor with a predetermined voltage to identify if the video signal is of the Standard to be identified; and
 (d) if the voltage across the capacitor is within a predetermined range, providing a second discharging current to the capacitor, the second discharging current being of a higher magnitude than the first charging or discharging current so as to discharge the capacitor at a second rate that is faster than the first rate.

12. The method of claim 11 wherein step (d) uses a Darlington circuit, connected to the capacitor, and a differential stage to provide the second discharging current.

13. The method of claim 11 wherein step (a) includes determining a sign relationship of the phrase relationship and wherein the method further comprises the step of inversing the sign relationship if the voltage across the capacitor reaches a threshold voltage.

14. A circuit for identifying the television Standard of the video signal, comprising:
 means for comparing the video signal to a comparison signal to determine a phase relationship between the video signal and the comparison signal, the means for comparing providing an output indicative of the phase relationship and including a polarity relation;
 charging means for charging a capacitor in response to the output of the means for comparing and in response to the polarity having a positive indication, the means for charging having a first magnitude charging current;
 means for discharging the capacitor in response to the output of the means for comparing and in response to the polarity having a negative indication, the means for discharging having a second magnitude discharging current, larger than the first magnitude charging current, if a voltage across the capacitor is higher than a predetermined voltage;
 means for inversing the polarity of the means for comparing if the voltage across the capacitor reaches a threshhold voltage; and
 means for detecting if the voltage across the capacitor exceeds a second threshhold voltage so as to identify the Standard.

15. The circuit of claim 14 wherein the means for discharging includes a comparitor receiving the voltage across the capacitor and the predetermined voltage and includes a current source to provide the second discharging current, the second discharging current being enabled when the comparator detects that the voltage across the capacitor is higher than the predetermined voltage.

* * * * *